(12) United States Patent
Di Federico et al.

(10) Patent No.: US 11,090,625 B2
(45) Date of Patent: Aug. 17, 2021

(54) APPARATUS AND METHOD FOR WITHDRAWING SAMPLES FROM A UNIT OF A POLYMERIZATION PLANT

(71) Applicant: BASELL POLIOLEFINE ITALIA S.R.L., Milan (IT)

(72) Inventors: Pier Luigi Di Federico, Ferrara (IT); Martin Andries De Zeeuw, RK Alphen Aan Den Rijn (NL)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 16/962,601

(22) PCT Filed: Jan. 4, 2019

(86) PCT No.: PCT/EP2019/050125
§ 371 (c)(1),
(2) Date: Jul. 16, 2020

(87) PCT Pub. No.: WO2019/141521
PCT Pub. Date: Jul. 25, 2019

(65) Prior Publication Data
US 2020/0398244 A1    Dec. 24, 2020

(30) Foreign Application Priority Data

Jan. 19, 2018 (EP) .................. 17196515

(51) Int. Cl.
*B01J 8/00*    (2006.01)
*G01N 1/20*    (2006.01)
*B01J 4/00*    (2006.01)
*B01J 19/00*   (2006.01)
*B01J 19/06*   (2006.01)
*G01N 1/14*    (2006.01)
*G01N 1/10*    (2006.01)

(52) U.S. Cl.
CPC ............. *B01J 8/0035* (2013.01); *B01J 4/002* (2013.01); *B01J 4/008* (2013.01); *B01J 8/004* (2013.01); *B01J 19/0006* (2013.01); *B01J 19/06* (2013.01); *G01N 1/14* (2013.01); *G01N 1/2035* (2013.01); *B01J 2204/005* (2013.01); *B01J 2208/00955* (2013.01); *B01J 2219/00162* (2013.01); *B01J 2219/00186* (2013.01); *G01N 2001/105* (2013.01); *G01N 2001/205* (2013.01)

(58) Field of Classification Search
CPC ........ B01J 19/0006; B01J 19/06; B01J 8/008; B01J 8/004; B01J 8/0035; B01J 2219/00162; B01J 2219/00164; B01J 2219/00186; B01J 2208/00955; B01J 2208/00973; B01J 2208/00964; B01J 2208/00982; G01N 1/14; G01N 1/2035; G01N 2001/105; G01N 2001/205; G01N 2001/4083
See application file for complete search history.

(56) References Cited

U.S. PATENT DOCUMENTS 3,556,730 A * 1/1971 Mitacek ............... G01N 1/2035
                                                    436/85
6,592,827 B1 * 7/2003 Zilker, Jr. ............. B01J 8/1809
                                                    251/129.01

* cited by examiner

*Primary Examiner* — Lessanework Seifu

(57) ABSTRACT

An apparatus and a method to withdraw samples from a polymerization plant using a defined sequence of steps combined with locking devices for valves opened by a single key.

12 Claims, 2 Drawing Sheets

APPARATUS AND METHOD FOR WITHDRAWING SAMPLES FROM A UNIT OF A POLYMERIZATION PLANT

This application is the U.S. National Phase of PCT International Application PCT/EP2019/050125, filed Jan. 4, 2019, claiming benefit of priority to European Patent Application No. 17196515.5, filed Jan. 19, 2018, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to an apparatus and method for withdrawing samples from a unit of a polymerization plant.

BACKGROUND OF THE INVENTION

The polymerization of olefins is carried out in polymerization plants having several units, including reactors, transfer lines, filters, and tanks. In some instances and to control the polymerization process, samples of the olefin polymer are withdrawn from one or more of such units and analyzed. In some of those instances, one or more units of the polymerization plant are equipped with means for withdrawing samples from such units.

Withdrawal of material from a polymerization reactor requires acting on a nozzle or port provided in the reactor wall. The line downstream of the sampling port or nozzle is at the same pressure of the reactor during sampling, which requires blowing the sample safely down to atmospheric pressure.

SUMMARY OF THE INVENTION

In a general embodiment, the present disclosure provides an apparatus for withdrawing a sample from a unit of a polymerization plant provided with a sampling nozzle, the apparatus including:
  a sampling valve for connecting to the sampling nozzle;
  a first sample collection tank having a gas discharge conduit and a solid discharge port;
  a transfer conduit operatively connected at a first end to the sampling valve and at a second end to the first sample collection tank;
  a first control valve mounted on the transfer conduit downstream of the sampling valve, thereby controlling the flow of the sample into the transfer conduit;
  a second control valve mounted on the transfer conduit downstream of the first control valve and upstream of the first sample collection tank, thereby controlling the flow of the sample into the first sample collection tank;
  a third control valve mounted on the gas discharge conduit of the first sample collection tank;
  a second sample collection tank, located below the first sample collection tank and connected to the first sample collection tank via a fourth control valve mounted on the solid discharge port and the fourth control valve having a locking device;
  a solid discharge conduit connected to a discharge port at the bottom of the second sample collection tank;
  a fifth control valve mounted on the solid discharge conduit and the fifth control valve having a locking device;
  a sixth control valve mounted on the solid discharge conduit downstream of the fifth control valve; and
  a flushing system for flushing the conduits and the valves;
wherein
the locking devices of the fourth and fifth control valves are operable by a single key,
the single key is extractable from the locking devices only when the locking devices are locked, and
the single key opens one of the fourth and fifth control valves only when the other of the fourth and fifth control valves is closed.

In a general embodiment, the present disclosure provides a method for withdrawing samples from a unit of a polymerization plant having a sampling nozzle, wherein the unit operates at a pressure above the atmospheric pressure, by an apparatus including:
  a sampling valve for connecting to the sampling nozzle;
  a first sample collection tank having a gas discharge conduit and a solid discharge port;
  a transfer conduit operatively connected at a first end to the sampling valve and at a second end to the first sample collection tank;
  a first control valve mounted on the transfer conduit downstream of the sampling valve, thereby controlling the flow of a sample of a polymerization unit into the transfer conduit;
  a second control valve mounted on the transfer conduit downstream of the first control valve and upstream of the first sample collection tank, thereby controlling the flow of the sample into the first sample collection tank;
  a third control valve mounted on the gas discharge conduit of the first sample collection tank;
  a second sample collection tank, located below the first sample collection tank and connected to the first sample collection tank via a fourth control valve mounted on the solid discharge port and the fourth control valve having a locking device;
  a solid discharge conduit connected to a discharge port at the bottom of the second sample collection tank;
  a fifth control valve mounted on the solid discharge conduit and the fifth control valve having a locking device;
  a sixth control valve mounted on the solid discharge conduit downstream of the fifth control valve; and
  a flushing system for flushing the conduits and the valves;
wherein the locking devices of the fourth and fifth control valves are operable by a single key, the single key is extractable from the locking devices only when the locking devices are locked, and the single key opens one of the fourth and fifth control valves only when the other of the fourth and fifth control valves is closed;
the method including the steps of:
a. setting the valves in the closed position and keeping the single key of the locking devices of the fourth and fifth control valves inserted in the locking device of the fifth control valve;
b. opening the first, second and third control valves and flushing the valves, the transfer conduit, the first sample collection tank and the gas discharge conduit with a cleaning gas provided by the flushing system;
c. closing the third control valve and opening the sampling valve to withdraw the sample from the unit of a polymerization plant and transferring the sample via the transfer conduit to the first sample collection tank;
d. detecting that the sample is present in the first sample collection tank;

e. opening the third control valve to remove gas and vaporizable liquid from the sample collected in the first sample collection tank;
f. extracting the single key from the locking device of the fifth control valve;
g. inserting the single key in the locking device of the fourth control valve and opening the fourth control valve, whereby the sample collected in the first sample collection tank is discharged under gravity into the second sample collection tank;
h. closing the fourth control valve and extracting the single key from the locking device of the fourth control valve;
i. inserting the single key in the locking device of the fifth control valve and opening the fifth control valve; and
j. opening the sixth control valve, whereby the sample collected in the second sample collection tank is discharged through the discharge conduit.

As used herein, the term "units of a polymerization plant" refers to any device or equipment that contains the polymer, which is being formed or is already formed as a result of the polymerization reactor, both in a rest state or in a transfer state. The term includes reactors, transfer lines, filters, and tanks, without being limited to these pieces of equipment. When operated, the unit is at a pressure $P_1$ above the pressure $P_2$ of the apparatus for withdrawing a sample. In some embodiments, when the apparatus for withdrawing a sample is not in fluid communication with the unit of the polymerization plant, the pressure $P_2$ of the apparatus is the atmospheric pressure, or slightly above.

As used herein, the term "sampling valve" refers to a valve that allows taking a representative portion of a solid or of a mixture of a solid with a liquid, a gas, or both, for testing.

As used herein, the term "control valve" refers to a valve that allows controlling the flow of a material by varying the size of the flow passage as directed by a signal from a controller.

BRIEF DESCRIPTION OF THE DRAWINGS

The following figures illustrate an embodiment of the subject matter disclosed herein. The claimed subject matter may be understood by reference to the following description taken in conjunction with the accompanying figure, in which like reference numerals identify like elements, and in which:

DETAILED DESCRIPTION OF THE INVENTION

Figure 1:
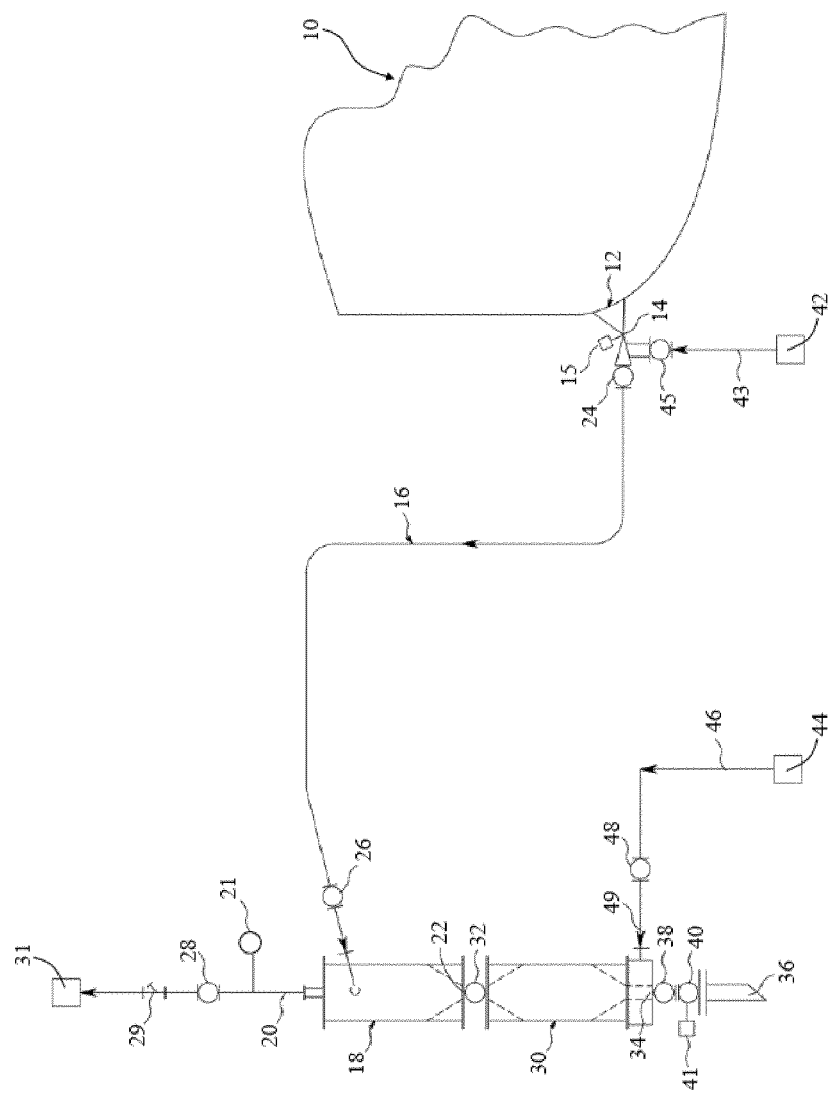
FIG. 1 is a schematic representation of an apparatus for withdrawing samples from a unit of a polymerization plant according to an embodiment of the present disclosure.
Figure 2:
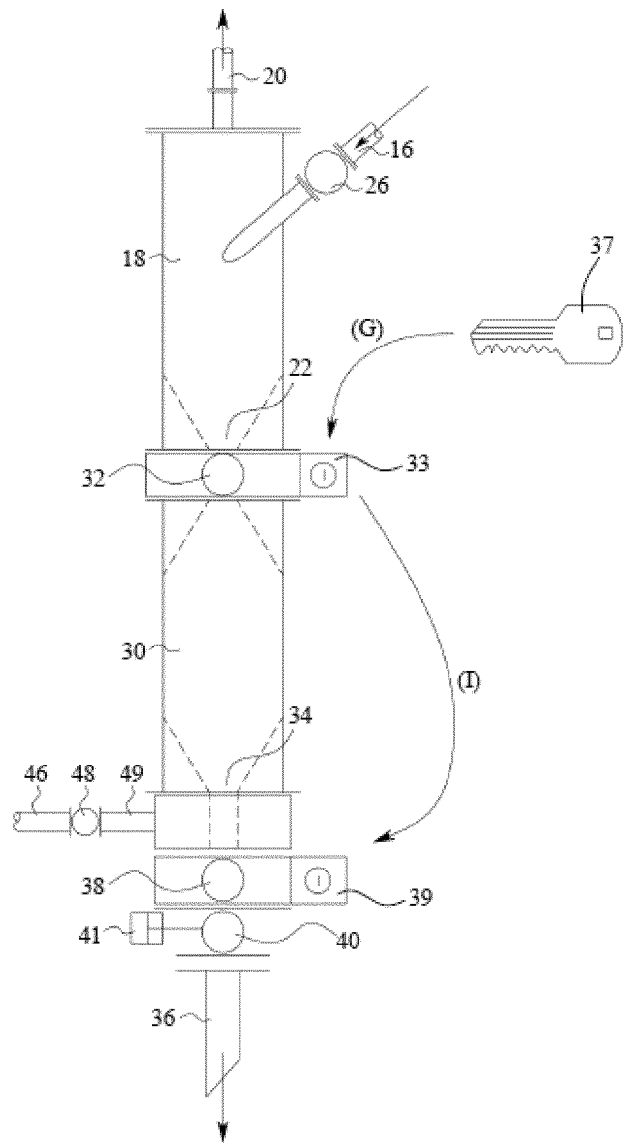
FIG. 2 is an expanded schematic representation of a portion of an apparatus for withdrawing samples from a unit of a polymerization plant according to an embodiment of the present disclosure.

The disclosure is now described with reference to FIG. 1, wherein 10 designates a portion of polymerization unit containing an olefin polymer. In some embodiments, the olefin polymer is polyethylene or polypropylene.

In some embodiments, the polymerization unit 10 is a polymerization reactor. In some embodiments, the polymerization reactor is a reactor for slurry polymerization or for gas-phase polymerization, including loop reactors. In some embodiments, unit 10 operates at a pressure $P_1$ above the atmospheric pressure. In some embodiments, unit 10 is a polymerization reactor and operates at pressures of up to 10 MPa, depending on the type of polymerization process and reactor.

Unit 10 is provided with a sampling nozzle 12 from which a sample of the polymer or of the polymer slurry can be withdrawn for the purpose of testing. In some embodiments, nozzle 12 is located in a point of the reactor wherein the polymer is in a densified form or is settled. In some embodiments, the reactor is a gas-phase reactor of the type having interconnected polymerization zones, where the growing polymer particles flow through a first polymerization zone (riser) under fast fluidization or transport conditions, leave the riser and enter a second polymerization zone (downcomer), and the sampling nozzle 12 is located in the downcomer.

In some embodiments, the nozzle 12 is formed or equipped with a reinforcing pad, thereby providing stability and sealed connection between unit 10 and the sampling apparatus.

Withdrawal of samples is carried out by an apparatus having, at a first end, a sampling valve 14 adapted for connection to the sampling nozzle 12.

In some embodiments, sampling valve 14 is a piston valve. The sampling valve is directly coupled to the sampling nozzle 12, providing that when the valve is closed, the piston element is pushed against the wall of the unit and the end surface of the piston element is aligned with this wall. As such, none of the valve is Tillable by the polymerization material, thereby assuring continuous operability of the sampling nozzle.

Sampling valve 14 is actuated by a servo-pneumatic device 15. In some embodiments, an operator actuates the servo-pneumatic device by pressing a button on a control panel. Valve 14 remains in the open position as long as the presses the button and switches to the closed position when the operator releases the button. Because the pressure $P_2$ of the sampling apparatus is below the pressure $P_1$ of the unit 10, the difference of pressure causes the transfer of material. In some embodiments, the pressure $P_2$ of the sampling apparatus is the atmospheric pressure, or slightly above the atmospheric pressure. The operator determines manually the duration of the sampling step, thereby ensuring flexibility and safety of the sampling step.

The sample withdrawn by a sampling valve 14 enters transfer conduit 16 via a first control valve 24 mounted on the transfer conduit 16 downstream of the sampling valve 12. In some embodiments, control valve 24 is a ball valve, alternatively a full-bore ball valve. Control valve 24 controls the flow of the sample. When control valve 24 is in the closed position, control valve 24 prevent the flow of material into the transfer conduit 16. It is believed that a ball valve provides a higher degree of certainty of blocking the passage of material than a piston valve. In some embodiments, the pressure within unit 10 is above the atmospheric pressure, alternatively 4-5 MPa.

A second control valve 26 is mounted on a second end of transfer conduit 16, downstream of the first control valve 14 and upstream of a first sample collection tank 18.

In some embodiments, control valve 26 is a ball valve, alternatively a full-bore ball valve. When both of the first and second control valves are in the closed position, the association of the first and second control valves 24 and 26 prevents the flow of material from the transfer conduit 16 toward the first sample collection tank 18. In some embodiments, the prevention of material flow toward sample collection tank 18 facilitates maintenance activities in the sample collection tank 18.

A fluid communication between unit 10 and the first sample collection tank 18 is established only when the sampling valve 14, the first control valve 24 and the second control valve 26 are open. In this condition, the pressure within the first sample collection tank 18 is the same as the pressure within unit 10, namely $P_1=P_2$.

The first sample collection tank 18 has a top portion provided with a gas discharge conduit 20 and a bottom portion provided with a solid discharge port 22.

A third control valve 28 is mounted on gas discharge conduit 20 of the first sample collection tank 18. In some embodiments, opening the third control valve 28 results in discharging pressurized gases from the sample transferred to collection tank 18. In some embodiments, the third control valve 28 is a ball valve, alternatively a full-bore ball valve. In some embodiments, the solid fraction of the sample contained in collection tank 18 is removed through the discharge port 22.

The gas discharge conduit 20 has a differential pressure gauge 21 upstream of the third control valve 28, for measuring the pressure in the collection tank 18. Differential pressure gauge 21 has a sensor cell having a membrane that adheres to the wall of the gas discharge conduit 20, thereby preventing the formation of discontinuity on the wall of conduit 20 and the deposit of polymer.

The gas discharge conduit 20 has a filter 29 downstream of the third control valve 28, for removing solid particles entrained by the gas leaving collection tank 18. In some embodiments, the gas stream is then transferred to a blow-down low-pressure system 31 located downstream of filter 29, to which other discharge gases are transferred for treatment or elimination. In some embodiments, the elimination occurs by the use of a flare.

The discharge port 22 of the first sample collection tank 18 is equipped with a fourth control valve 32. In some embodiments, the fourth control valve 32 is a ball valve, alternatively a full-bore ball valve.

A second sample collection tank 30 is located below the first sample collection tank 18 and is connected to the first sample collection tank 18 via the fourth control valve 32. The fourth control valve 32 is operated manually and provided with a locking device.

The second sample collection tank 30 has a bottom portion provided with a solid discharge port 34, connected to a solid discharge conduit 36 via a fifth control valve 38, also provided with a locking device, and a sixth control valve 40, mounted on the solid discharge conduit downstream of the fifth control valve 38.

The fifth control valve 38 is operated manually and provided with a locking device. In some embodiments, the fifth control valve 38 is a ball valve, alternatively a full-bore ball valve.

By opening the fourth control valve 32, the sample contained in the first sample collection tank 18 is discharged under gravity into the second sample collection tank 30. By opening the fifth control valve 38 and the sixth control valve 40, the sample contained in the second sample collection tank 30 is discharged from the sampling apparatus to the external environment. In some embodiments, the external-environment discharge is into a container or a line for carrying out the analysis.

The locking devices of the fourth 32 and fifth 38 control valves are operable by a single key. The single key is extractable from the locking devices only when the locking device are locked. In some embodiments, the single key has the shape of a card bearing a code that is recognized by the locking devices.

Opening of the fifth control valve 38 requires the use of the same key, which is used to lock the fourth control valve 32, which single key is extractable from the locking device of the fourth control valve 32 only if fourth control valve 32 is closed. The fourth control valve 32 and the fifth control valve 38 are operated manually. The single key opens the fifth control valve 38 only when the fourth control valve 32 is closed; correspondingly, the single key opens the fourth control valve 32 only when the fifth control valve 38 is closed.

Features of the fourth 32 and fifth 38 control valves prevent both valves from being open at the same time. With at least one of fourth control valve 32 and fifth control valve 38 closed, the sampling apparatus, and the unit 10, are isolated from the external environment. Opening of the sixth control valve 40 does not overcome the isolation provided by the closure of at least one of fourth control valve 32 and fifth control valve 38.

The fourth 32 and fifth 38 control valves provided with locking devices operated by a single key. As used herein, the locking devices operated by a single key are termed "car-sealed valves".

The sixth control valve 40 is actuated by a servo-pneumatic device 41. In some embodiments, an operator actuates the servo-pneumatic device by pressing a button on a control panel. Valve 40 remains in the open position as long as the operator presses the button and switches to the closed position when the operator releases the button. The operator determines manually the amount of the sample withdrawn.

The apparatus for withdrawing samples is provided with a flushing system for cleaning conduits and valves from deposits of polymer and residues of liquid and gas.

The flushing system has sources 42 and 44 of a cleaning gas, which is circulated under pressure into the conduits, valves, tanks and filters of the sampling apparatus. In some embodiments, the cleaning gas is nitrogen. Source 42 is connected via a first flush conduit 43 to a first flush valve 45, which is mounted upstream of sampling valve 14. Source 44 is connected via a second flush conduit 46 to a second flush valve 48, which is connected to the bottom of the second sample collection tank 30 via line 49.

In some embodiments, there is a single source of nitrogen connected to lines 43 and 46. In some embodiments, the cleaning gas introduced into line 43 cleans conduit 16 and the valves mounted on conduit 16, and the cleaning gas introduced into line 46 cleans the first and second sample collection tank 18 and 30, as well as conduit 20 and the valves mounted on conduit 20.

In a general embodiment, the present disclosure provides a method for withdrawing samples from a unit of a polymerization plant by a sampling apparatus.

The pressure P1 within unit 10 is above the atmospheric pressure. In some embodiments, unit 10 is a polymerization reactor and operates at pressures of up to 10 MPa, depending on the type of polymerization process. In some embodiments, the pressure is about 4-5 MPa. When the sampling valve 14 and the first control valve 24 are open, the pressure within conduit 16 of the sampling apparatus is the same as the pressure within unit 10, and when the second control valve 26 is also open, the pressure in the first sample collection tank is the same as the pressure of unit 10.

The method for withdrawing samples from unit 10 includes a sequence of steps.

In step (a), the valves of the apparatus are set in the closed position. The single key of the locking devices of the fourth (32) control valve and fifth (38) control valve is inserted in the locking device of the fifth (38) control valve.

In step (b), the first (24), second (26) and third (28) control valves are opened. By operating the flushing system, the flush gas is released from source 42 into line 43, and, by opening valve 45, into transfer conduit 16, the first sample collection tank (18) and the gas discharge conduit 20. The flush gas cleans the apparatus of deposits and residues and prepares the apparatus for sampling.

In step (c), the third control valve (28) is closed and the sampling valve (14) is opened to withdraw a sample of a polymerization material from unit 10. An operator actuates sampling valve 14 by a servo-pneumatic device 15, by pressing a button on a control panel. The sampling valve 14 remains in the open position as long as the operator presses the button. The operator determines manually the duration of the sampling step. Because the first (24) and second (26) control valves are opened, the sample is transferred into the first sample collection tank 18.

Step (d) includes detecting that the sample of polymerization material is present in the first sample collection tank 18, by checking the differential pressure gauge 21 mounted in the gas discharge conduit 20.

In step (e), the third control valve 28 is opened to remove gas and vaporizable liquid from the sample present in the first sample collection tank 18. The solid part of the sample remains in the first sample collection tank 18. The solid part is the polymer. The pressure $P_2$ in the tank 18 is about atmospheric pressure. The gases and vaporizable liquid released from tank 18 are filtered by filter 29 and transferred to a low-pressure blow down system 31, and then to a flare.

In step (f), the single key of the locking device of the fifth (38) control valve is extracted.

In step (g), the single key is then inserted in the locking device of the fourth (32) control valve and the fourth control valve 32 is then opened. Opening of the fourth control valve 32 results in discharging under gravity the sample into the second sample collection tank 30.

In step (h), the fourth control valve 32 is closed, and the single key is then extracted from the locking device of the fourth control valve 32.

In step (i), the single key is inserted in the locking device of the fifth control valve 38 and the fifth control valve 38 is then opened.

In step (j), the sixth control valve 40 mounted on the solid discharge conduit 36 is opened. The sample is discharged under gravity into the external environment through the discharge conduit 36. An operator actuates the sixth control valve 40 by a servo-pneumatic device 41, by pressing a button on a control panel. The sixth control valve 40 remains in the open position as long as the operator presses the button and switches to the closed position when the operator releases the button. The operator determines manually the amount of the sample withdrawn.

The method for withdrawing samples is performed through a predetermined sequence, thereby preventing or minimizing human or system errors.

Multiple valves are between the unit 10 of the polymerization plant and the external environment. In some embodiments, the sampling valve 14 is associated with the first control valve 24 and control valve 26, thereby isolating unit 10 from the first sample collection tank 18;

an operator actuates the sampling valve 14 by a servo-pneumatic device, thereby determining manually the duration of the sampling step;

the fourth 32 and fifth 38 control valves are equipped with locking devices operated by a single key, thereby ensuring that at least one of the fourth control valve 32 and the fifth control valve 38 is closed;

a sixth control valve 40 is associated with the fifth control valve 38, thereby isolating the second sample collection tank 30 from the external environment; and an operator actuates the sixth control valve 40 by a servo-pneumatic device 41, thereby determining the amount of the sample withdrawn.

The invention claimed is:

1. An apparatus for withdrawing a sample from a unit of a polymerization plant having a sampling nozzle, comprising:

a sampling valve for connecting to the sampling nozzle;

a first sample collection tank having a gas discharge conduit and a solid discharge port;

a transfer conduit operatively connected at a first end to the sampling valve and at a second end to the first sample collection tank;

a first control valve mounted on the transfer conduit downstream of the sampling valve, thereby controlling the flow of the sample into the transfer conduit;

a second control valve mounted on the transfer conduit downstream of the first control valve and upstream of the first sample collection tank, thereby controlling the flow of the sample into the first sample collection tank;

a third control valve mounted on the gas discharge conduit of the first sample collection tank;

a second sample collection tank, located below the first sample collection tank and connected to the first sample collection tank via a fourth control valve and the fourth control valve having a locking device;

a solid discharge conduit connected to a discharge port at the bottom of the second sample collection tank;

a fifth control valve mounted on the solid discharge conduit and the fifth control valve having a locking device;

a sixth control valve mounted on the solid discharge conduit downstream of the fifth control valve; and a flushing system for flushing the conduits and the valves; wherein the locking devices of the fourth and fifth control valves are operable by a single key, the single key is extractable from the locking devices only when the locking devices are locked, and the single key open of one of the fourth and fifth valves only when the other of the fourth and fifth control valves is closed.

2. The apparatus for withdrawing a sample according to claim 1, wherein the sampling valve is a piston valve directly coupled to the sampling nozzle and, in the closed position, comprises a piston element pushed against the wall of the unit and the piston element having an end surface aligned with the wall, thereby assuring continuous operability of the sampling nozzle.

3. The apparatus for withdrawing a sample according to claim 1, wherein the sampling valve is actuated by a servo-pneumatic device.

4. The apparatus for withdrawing a sample according to claim 1, wherein the sixth control valve is actuated by a servo-pneumatic device.

5. The apparatus for withdrawing a sample according to claim 1, wherein the gas discharge conduit has a filter downstream of the third control valve and a blow-down low-pressure system downstream of the filter.

6. The apparatus for withdrawing a sample according to claim 1, wherein the fourth control valve is mounted on the solid discharge port of the first sample collection tank.

7. The apparatus for withdrawing a sample according to claim 1, wherein the flushing system comprises:
- a source of a cleaning gas;
- a first flush conduit connecting the source of cleaning gas to the sampling valve;
- a second flush conduit connecting the source of flushing gas to the second sample collection tank;
- a first flush valve mounted on the first flush conduit upstream of the sampling valve; and
- a second flush valve mounted on the second flush conduit and connected to the bottom of the second sample collection tank via a line.

8. The apparatus for withdrawing a sample according to claim 1, wherein the gas discharge conduit has a differential pressure gauge mounted upstream of the third control valve and the differential pressure gauge comprises a sensor cell having a membrane that adheres to a wall of the gas discharge conduit, thereby preventing the formation of discontinuity on the wall of conduit.

9. A method for withdrawing samples from a unit of a polymerization plant having a sampling nozzle by an apparatus comprising:
- a sampling valve for connecting to the sampling nozzle;
- a first sample collection tank having a gas discharge conduit and a solid discharge port;
- a transfer conduit operatively connected at a first end to the sampling valve and at a second end to the first sample collection tank;
- a first control valve mounted on the transfer conduit downstream of the sampling valve, thereby controlling the flow of a sample of a polymerization material into the transfer conduit;
- a second control valve mounted on the transfer conduit downstream of the first control valve and upstream of the first sample collection tank, thereby controlling the flow of the sample into the first sample collection tank;
- a third control valve mounted on the gas discharge conduit of the first sample collection tank;
- a second sample collection tank, located below the first sample collection tank and connected to the first sample collection tank via a fourth control valve mounted on the solid discharge port and the fourth control valve having a locking device;
- a solid discharge conduit connected to a discharge port at the bottom of the second sample collection tank;
- a fifth control valve mounted on the solid discharge conduit and the fifth control valve having a locking device;
- a sixth control valve mounted on the solid discharge conduit downstream of the fifth control valve; and
- a flushing system for flushing the conduits and the valves;

wherein the locking devices of the fourth and fifth control valves are operable by a single key, the single key is extractable from the locking devices only when the locking devices are locked, and the single key opens one of the fourth and fifth control valves only with the other of the fourth and fifth control valves is closed; and the unit being operated at a pressure $P_1$ above the pressure $P_2$ of the apparatus; the method comprising the steps of:

a. setting the valves in the closed position and keeping the single key of the locking devices of the fourth and fifth control valves inserted in the locking device of the fifth control valve;

b. opening the first, second and third control valves and flushing the valves, the transfer conduit, the first sample collection tank and the gas discharge conduit with a cleaning gas provided by the flushing system;

c. closing the third control valve and opening the sampling valve to withdraw the sample from the unit of a polymerization plant and transferring the sample via the transfer conduit to the first sample collection tank;

d. detecting that the sample is present in the first sample collection tank;

e. opening the third control valve to remove gas and vaporizable liquid from the sample collected in the first sample collection tank;

f. extracting the single key from the locking device of the fifth control valve;

g. inserting the single key in the locking device of the fourth control valve and opening the fourth control valve, whereby the sample collected in the first sample collection tank is discharged under gravity into the second sample collection tank;

h. closing the fourth control valve and extracting the single key from the locking device of the fourth control valve;

i. inserting the single key in the locking device of the fifth control valve and opening the fifth control valve; and j. opening the sixth control valve, whereby the sample collected in the second sample collection tank is discharged through the discharge conduit.

10. The method according to claim 9, wherein step (c) is carried out by an operator (I) opening the sampling valve by actuating a servo-pneumatic device and (II) determining manually the duration of the sampling step.

11. The method according to claim 9, wherein step (d) is carried out by using a differential pressure gauge mounted in the gas discharge conduit.

12. The method according to claim 9, wherein step j) is carried out by an operator (I) opening the sixth control valve by actuating a servo-pneumatic device and (II) determining manually the amount of the sample withdrawn.

* * * * *

UNITED STATES PATENT AND TRADEMARK OFFICE
CERTIFICATE OF CORRECTION

PATENT NO. : 11,090,625 B2
APPLICATION NO. : 16/962601
DATED : August 17, 2021
INVENTOR(S) : Di Federico et al.

Page 1 of 1

It is certified that error appears in the above-identified patent and that said Letters Patent is hereby corrected as shown below:

On the Title Page

Column 1, Item (30), Line 1, delete "17196515" and insert -- 17196515.5 --, therefor In the Specification In Column 4, Line 28, delete "Tillable" and insert -- fillable --, therefor Signed and Sealed this
Twenty-fourth Day of January, 2023

Katherine Kelly Vidal
*Director of the United States Patent and Trademark Office*